(12) United States Patent
Sim et al.

(10) Patent No.: US 12,014,876 B2
(45) Date of Patent: Jun. 18, 2024

(54) MULTILAYER CAPACITOR

(71) Applicant: SAMSUNG ELECTRO-MECHANICS CO., LTD., Suwon-si (KR)

(72) Inventors: Won Chul Sim, Suwon-si (KR); Soo Hwan Son, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 43 days.

(21) Appl. No.: 17/691,776

(22) Filed: Mar. 10, 2022

(65) Prior Publication Data

US 2023/0187136 A1   Jun. 15, 2023

(30) Foreign Application Priority Data

Dec. 13, 2021   (KR) .......................... 10-2021-0177581

(51) Int. Cl.
*H01G 4/232*    (2006.01)
*H01G 4/12*     (2006.01)
*H01G 4/30*     (2006.01)

(52) U.S. Cl.
CPC ........... *H01G 4/232* (2013.01); *H01G 4/1227* (2013.01); *H01G 4/30* (2013.01)

(58) Field of Classification Search
CPC ............ H01G 4/232; H01G 4/30; H01G 4/32; H01G 4/1227
See application file for complete search history.

(56) References Cited

U.S. PATENT DOCUMENTS

| 5,835,338 A    * | 11/1998 | Suzuki ..................... H01G 4/30 361/321.2 |
| 2001/0017420 A1* | 8/2001  | Iwao .................... H01F 17/0013 257/693 |
| 2006/0171130 A1* | 8/2006  | Konishi .............. H01L 25/0652 257/E23.125 |
| 2008/0084651 A1  | 4/2008  | Oguni et al. |
| 2010/0014213 A1* | 1/2010  | Wozniak ............... C04B 35/486 338/21 |
| 2013/0148259 A1* | 6/2013  | Masuda ................. H01G 4/302 29/25.03 |

(Continued)

FOREIGN PATENT DOCUMENTS

| JP | 4418969 B2      | 2/2010  |
| JP | 2016-081937 A   | 5/2016  |
| KR | 10-2015-0125443 A | 11/2015 |

*Primary Examiner* — Michael P McFadden
(74) *Attorney, Agent, or Firm* — Morgan, Lewis & Bockius LLP

(57) ABSTRACT

A multilayer capacitor includes a body including a capacitance region in which at least one first internal electrode and at least one second internal electrode are alternately laminated in a first direction with at least one dielectric layer interposed therebetween; and first and second external electrodes spaced apart from each other and disposed on the body to be connected to the at least one first internal electrode and the at least one second internal electrode, respectively, wherein the body further includes a buffer layer disposed in the capacitance region and having a Young's modulus of greater than 0 time and (50/135) times or less of a Young's modulus of the at least one dielectric layer.

16 Claims, 6 Drawing Sheets

(56) References Cited

U.S. PATENT DOCUMENTS

| | | | |
|---|---|---|---|
| 2015/0146343 A1* | 5/2015 | Ellmore | H01G 4/385 |
| | | | 361/301.4 |
| 2015/0318109 A1 | 11/2015 | Lee et al. | |
| 2016/0308075 A1* | 10/2016 | Wang | H01L 27/1446 |
| 2018/0012706 A1* | 1/2018 | Bultitude | H01G 4/33 |
| 2018/0294102 A1* | 10/2018 | Trinh | H01G 4/30 |
| 2019/0043669 A1* | 2/2019 | Trinh | H01G 4/35 |
| 2019/0267193 A1* | 8/2019 | Beck | H01G 4/1245 |
| 2020/0152389 A1* | 5/2020 | Kim | H01G 4/012 |

\* cited by examiner

A-A'

B-B'

MULTILAYER CAPACITOR

CROSS-REFERENCE TO RELATED APPLICATIONS

This application claims benefit of priority to Korean Patent Application No. 10-2021-0177581 filed on Dec. 13, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor has been widely used as a component of electronic devices such as computers, PDAs, mobile phones, and the like, as a multilayer capacitor may have a small size and high capacitance, and may be easily mounted, and a multilayer capacitor has also been used as a component of electrical devices (including vehicles) as a multilayer capacitor may have high reliability and high strength.

A dielectric material having a high dielectric constant used for a multilayer capacitor may also have piezoelectric properties, such that a multilayer capacitor may be affected by internal stress caused by a reverse piezoelectric (or electrostrictive) phenomenon due to applied voltage, and internal stress may cause cracks in a multilayer capacitor or may deteriorate withstand voltage properties.

SUMMARY

An aspect of the present disclosure is to provide a multilayer capacitor which may reduce cracks caused by internal stress or may increase withstand voltage properties.

According to an aspect of the present disclosure, a multilayer capacitor includes a body including a capacitance region in which at least one first internal electrode and at least one second internal electrode are alternately laminated in a first direction with at least one dielectric layer interposed therebetween; and first and second external electrodes spaced apart from each other and disposed on the body to be connected to the at least one first internal electrode and the at least one second internal electrode, respectively, wherein the body further includes a buffer layer disposed in the capacitance region and having a Young's modulus of greater than 0 time and (50/135) times or less of a Young's modulus of the at least one dielectric layer.

According to an aspect of the present disclosure, a multilayer capacitor includes a body including a capacitance region in which at least one first internal electrode and at least one second internal electrode are alternately laminated in a first direction with at least one dielectric layer interposed therebetween; and first and second external electrodes spaced apart from each other and disposed on the body to be connected to the at least one first internal electrode and the at least one second internal electrode, respectively, wherein the body further includes a buffer layer disposed in the capacitance region and having a Young's modulus of 50 GPa or less.

According to an aspect of the present disclosure, A multilayer capacitor includes a body including at least one first internal electrode and at least one second internal electrode alternately laminated in a first direction with at least one dielectric layer interposed therebetween, and a buffer layer disposed between the at least one first internal electrode and the at least one second internal electrode, the buffer layer including at least one of epoxy, polyimide, and an Ajinomoto build-up film (ABF); and first and second external electrodes spaced apart from each other and disposed on the body to be connected to the at least one first internal electrode and the at least one second internal electrode, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
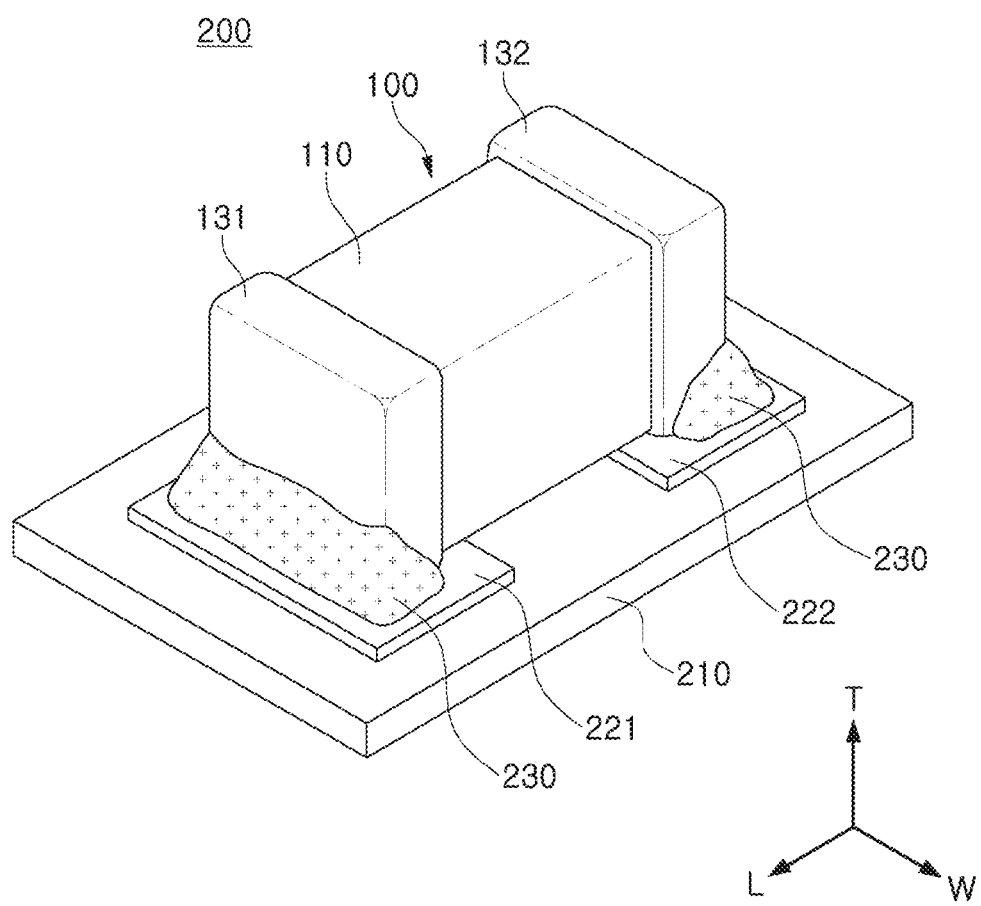
FIG. 1 is a perspective diagram illustrating a structure in which a multilayer capacitor is mounted on a substrate according to an example embodiment of the present disclosure.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Further, modifications of positions or arrangements of elements in example embodiments may be made without departing from the spirit and scope of the present disclosure. The following detailed description is, thus, not to be taken in a limiting sense, and the scope of the present invention are defined only by appended claims, appropriately interpreted, along with the full range of equivalents to which the claims are entitled.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

As for the directions of a hexahedron, L, W, and T in the drawings may indicate a length direction, a width direction, and a thickness direction, respectively. The thickness direction may be a lamination direction (or a first direction) in which the dielectric layers are laminated.

In the description below, a multilayer capacitor according to an example embodiment will be described, and particularly, a multilayer ceramic capacitor (MLCC) will be described, but an example embodiment thereof is not limited thereto.

Figure 2:
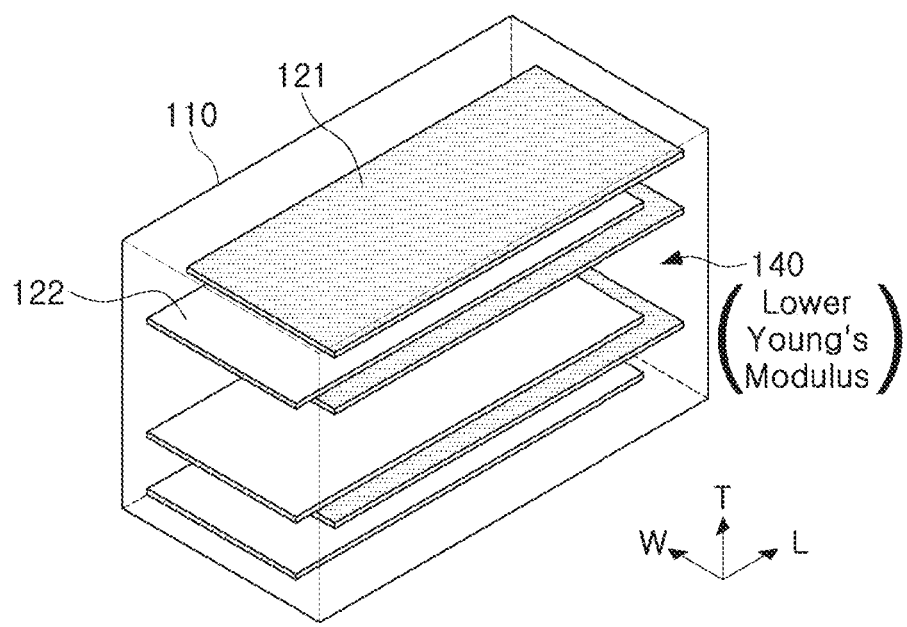
FIG. 2 is a perspective diagram illustrating an internal portion of a body of a multilayer capacitor according to an example embodiment of the present disclosure.
Figure 3A:
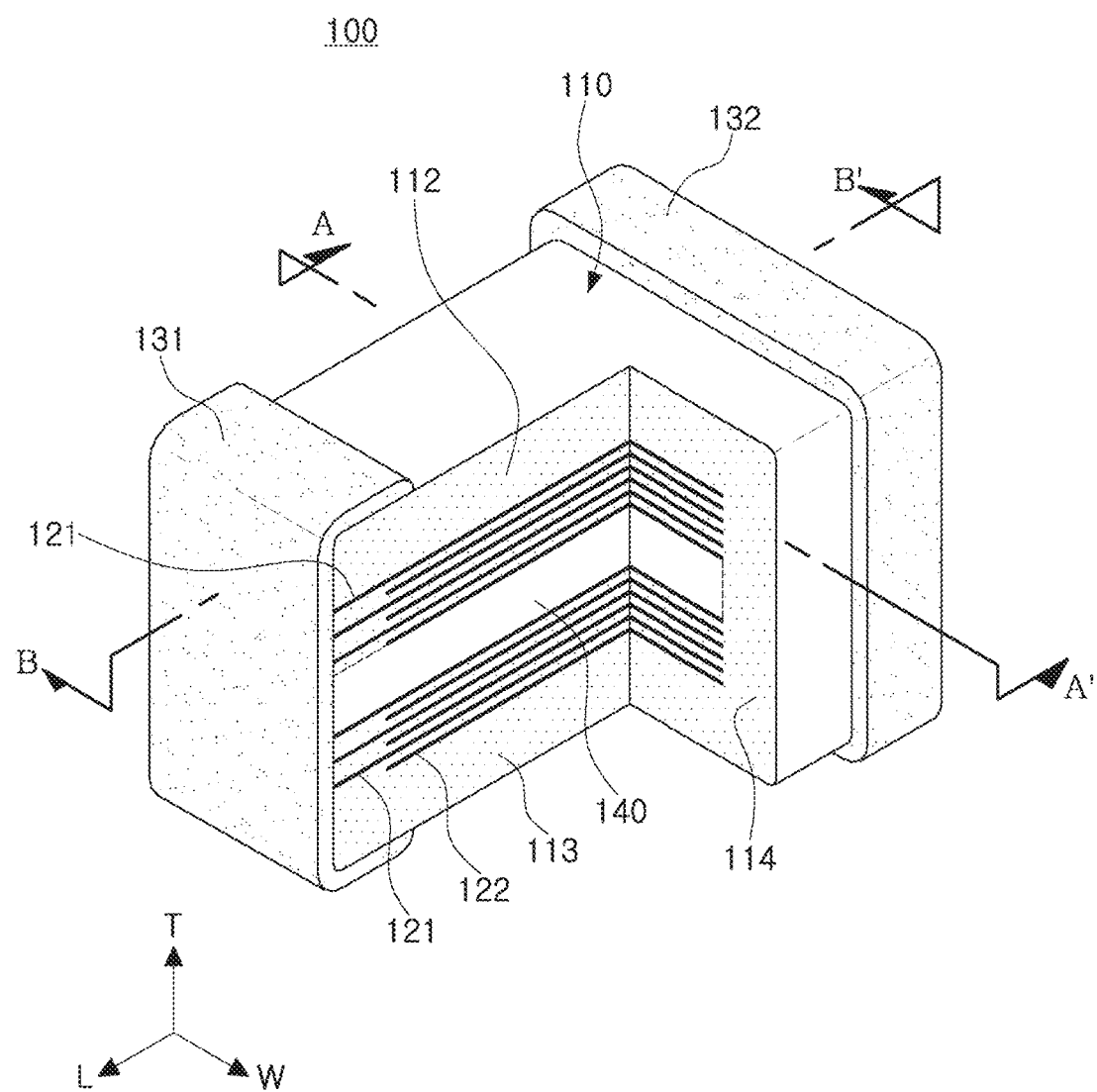
FIG. 3A is a perspective diagram illustrating a multilayer capacitor and an internal portion thereof according to an example embodiment of the present disclosure.
Figure 4:
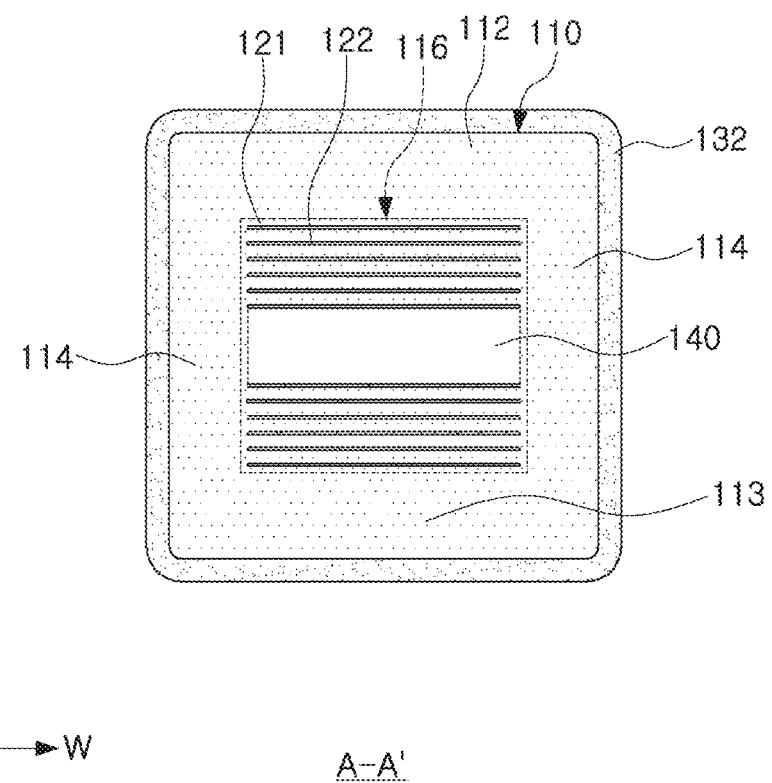
FIG. 4 is a cross-sectional diagram taken along line A-A' in FIG. 3A.
Figure 5:
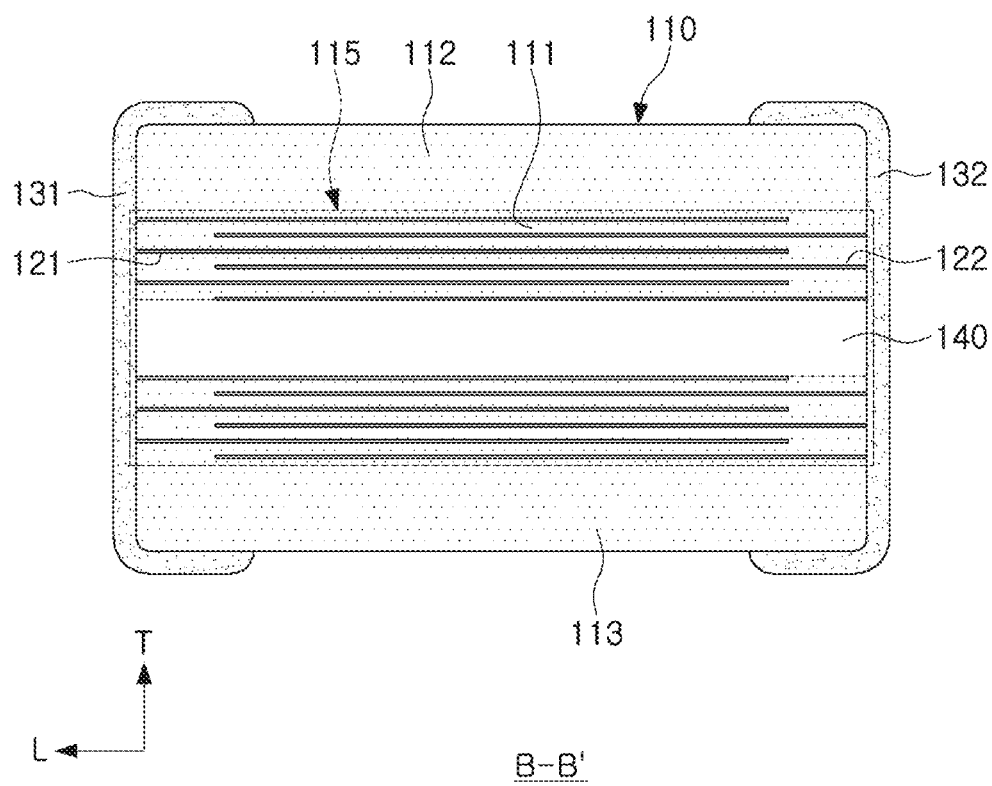
FIG. 5 is a cross-sectional diagram taken along line B-B' in FIG. 3A.

FIG. 1 is a perspective diagram illustrating a structure in which a multilayer capacitor is mounted on a substrate according to an example embodiment. FIG. 2 is a perspective diagram illustrating an internal portion of a body of a multilayer capacitor according to an example embodiment. FIG. 3A is a perspective diagram illustrating a multilayer capacitor and an internal portion thereof according to an example embodiment. FIG. 4 is a cross-sectional diagram taken along line A-A' in FIG. 3A. FIG. 5 is a cross-sectional diagram taken along line B-B' in FIG. 3A.

Referring to FIGS. 1, 2, 3A, 4, and 5, a multilayer capacitor 100 according to an example embodiment may include a body 110, a first external electrode 131, and a second external electrode 132.

The body 110 may include a laminate structure in which at least one first internal electrode 121 and at least one second internal electrode 122 are alternately laminated in a first direction (e.g., the T direction) with at least one dielectric layer 111 interposed therebetween.

For example, the body 110 may be configured as a ceramic body by firing the laminate structure. The at least one dielectric layer 111 disposed on the body 110 may be in a sintered state, and the boundary between dielectric layers adjacent to each other may be integrated such that it may be difficult to identify the boundary without using a scanning electron microscope (SEM).

For example, the body 110 may be formed as a hexahedron having both side surfaces in the length direction L, both side surfaces in the width direction W, and both side surfaces in the thickness direction T. The edges and/or corners may be rounded by being polished. However, the shape and the dimension of the body 110 and the number of laminated dielectric layers 111 are not limited to the illustrated examples.

The thickness of the at least one dielectric layer 111 may be arbitrarily changed according to the design of capacitance of the multilayer capacitor 100, and the dielectric layer 111 may include ceramic powder having a high dielectric constant, such as, for example, a barium titanate ($BaTiO_3$) powder, but an example embodiment thereof is not limited thereto. Also, various ceramic additives (e.g., MgO, $Al_2O_3$, $SiO_2$, ZnO), an organic solvent, a plasticizer, a binder, a dispersant, or the like, may be added to the ceramic powder according to the required configuration of the multilayer capacitor 100.

An average particle diameter of the ceramic powder used to form the at least one dielectric layer 111 may not be limited to any particular example, and may be adjusted according to the required configuration (e.g., miniaturization and/or high capacitance may be required as in a capacitor for electronic devices, or high withstand voltage properties and/or high strength may be required as in a capacitor for electrical devices), and may be adjusted to be, for example, 400 nm or less.

For example, the at least one dielectric layer 111 may be formed by forming a plurality of ceramic sheets by applying slurry including powder such as barium titanate ($BaTiO_3$) to a carrier film and drying the slurry. The ceramic sheet may be formed by preparing the slurry by mixing ceramic powder, a binder, and a solvent, and forming the slurry into a sheet having a thickness of several μm by a doctor blade method, but an example embodiment thereof is not limited thereto.

The at least one first internal electrode 121 and the at least one second internal electrode 122 may be formed by printing a conductive paste including a conductive metal and may be alternately exposed to one side surface and the other side surface of the body 110, taken in the length direction L, in the lamination direction (e.g., the T direction) of the dielectric layers, and may be electrically insulated from each other by the dielectric layer interposed therebetween.

For example, each of the at least one first internal electrode 121 and the at least one second internal electrode 122 may be formed by a conductive paste for internal electrodes including 40 to 50 wt % of conductive metal powder having an average particle size of 0.1 to 0.2 μm, but an example embodiment thereof is not limited thereto. The conductive paste may be nickel (Ni), copper (Cu), palladium (Pd), silver (Ag), lead (Pb), or platinum (Pt), or alloys thereof, but an example embodiment thereof is not limited thereto.

For example, an internal electrode pattern may be formed by applying the conductive paste for an internal electrode on the ceramic sheet by a printing method. The method of printing the conductive paste may be a screen-printing method, a gravure printing method and an inkjet printing method, but an example embodiment thereof is not limited thereto. For example, the body 110 may be manufactured by laminating in 200 to 300 layers of ceramic sheets on which the internal electrode pattern is printed, and pressing and firing the ceramic sheets.

Capacitance of the multilayer capacitor 100 may be proportional to an region of overlap between the at least one first internal electrode 121 and the at least one second internal electrode 122 in the lamination direction (e.g., in the T direction), may be proportional to a total number of laminated layers of the at least one first internal electrode 121 and the at least one second internal electrode 122, and may be inversely proportional to a distance between the at least one first internal electrode 121 and the at least one second internal electrode 122. The distance between the internal electrodes may be substantially the same as a thickness of each of the at least one dielectric layer 111.

The multilayer capacitor 100 may have a larger capacitance for a thickness thereof as the distance between the at least one first internal electrode 121 and the at least one second internal electrode 122 decreases, whereas the withstand voltage of the multilayer capacitor 100 may be higher as the distance between the internal electrodes increases. Accordingly, the distance between the internal electrodes may be adjusted according to the required configuration (e.g., miniaturization and/or high capacitance may be required as in a capacitor for electronic devices, or high withstand voltage properties and/or high strength may be required as in a capacitor for electrical devices). The thickness of each of the at least one first internal electrode 121 and the at least one second internal electrode 122 may also be affected by the distance between the internal electrodes.

For example, when high withstand voltage properties and/or high strength are required for the multilayer capacitor 100, the distance between the at least one first internal electrode 121 and the at least one second internal electrode 122 may be configured to exceed twice the thickness of each of the first internal electrode 121 and the second internal electrode 122. For example, when high withstand voltage properties and/or high strength are required for the multilayer capacitor 100, the thickness of each of the at least one first internal electrode 121 and the at least one second internal electrode 122 may be configured to be 0.4 μm or less and the total number of layers of the internal electrodes may be configured to be 400 or more.

The thickness of each internal electrode and dielectric layer may be measured by using at least one of transmission electron microscopy (TEM), atomic force microscope (AFM), scanning electron microscope (SEM), an optical microscope, and a surface profiler.

The first and second external electrodes 131 and 132 may be disposed in the body 110 to be spaced apart from each other so as to be connected to the at least one first internal electrode 121 and the at least one second internal electrode 12, respectively.

For example, each of the first and second external electrodes 131 and 132 may be formed by a method of dipping in a paste including a metal component, a method of printing a conductive paste, a sheet transfer, a pad transfer, a sputter plating method, or an electrolytic plating method. For example, the first and second external electrodes 131 and 132 may include a fired layer formed by firing the paste and a plating layer formed on an external surface of the fired layer, and a conductive resin layer may be further included between the fired layer and the plating layer. For example, the conductive resin layer may be formed as conductive particles are included in a thermosetting resin such as epoxy. The metal component may be copper (Cu), palladium (Pd), platinum (Pt), gold (Au), silver (Ag), lead (Pb), or tin (Sn), or alloys thereof, but an example embodiment thereof is not limited thereto.

The multilayer capacitor 100 may be mounted or embedded in an external substrate (e.g., a printed circuit board), and may be electrically connected to a circuit (e.g., an integrated circuit, or a processor) electrically connected to the substrate 210 by being connected to the first and second pads 221 and 222 on the substrate 210 via the first and second external electrodes 131 and 132.

While the first and second external electrodes 131 and 132 of the multilayer capacitor 100 are mounted on the first and second pads 221 and 222 of the substrate 210, the solder 230 may be disposed to be in contact with the first and second external electrodes 131 and 132 and the first and second pads 221 and 222 through a reflow process and may fix the first and second external electrodes 131 and 132 and the first and second pads 221 and 222. The solder 230 may have a melting point lower than that of copper (Cu), which may be contained in the first and second external electrodes 131 and 132, and may include tin (Sn) or a tin-based alloy.

Referring to FIGS. 3A, 4, and 5, the body 110 may include an upper cover layer 112, a lower cover layer 113, and a core region 115, and a core region 115 may include a margin region 114 and a capacitance region 116.

The upper and lower cover layers 112 and 113 may be disposed with the core region 115 interposed therebetween in the first direction (e.g., the T direction) and may have a thickness greater than a thickness of each of the at least one dielectric layer 111.

The upper and lower cover layers 112 and 113 may prevent external environmental elements (e.g., moisture, plating solution, foreign substances) from permeating the core region 115, may protect the body 110 from external impacts, and may also improve strength of the body 110.

For example, the upper and lower cover layers 112 and 113 may include a material the same as the material of the at least one dielectric layer 111 or a material (e.g., a thermosetting resin such as an epoxy resin) different from the material of the at least one dielectric layer 111.

The capacitance region 116 may form the capacitance of the multilayer capacitor 100 by including a region between the at least one first internal electrode 121 and the at least one second internal electrode 122.

The capacitance region 116 may include a laminate structure in which the at least one first internal electrode 121 and the at least one second internal electrode 122 are alternately laminated in the first direction (e.g., a T direction) with the at least one dielectric layer 111 interposed therebetween, and may have the same dimension as that of the laminate structure.

The margin region 114 may include regions between side boundary lines of the capacitance region 116 and the side surfaces of the body 110.

The plurality of margin regions 114 may be disposed with the capacitance region 116 interposed therebetween in a second direction (e.g., W direction) perpendicular to the first direction (e.g., T direction). For example, the plurality of margin regions 114 may be formed by a method similar to the method forming the at least one dielectric layer 111 (the lamination directions may be different).

The plurality of margin regions 114 may prevent the at least one first internal electrode 121 and the at least one second internal electrode 122 from exposing to the surface of the body 110 in the second direction (e.g., W direction), such that the external environmental elements (e.g., moisture, plating solution, foreign substances) may be prevented from permeating the at least one first internal electrode 121 and the at least one second internal electrode 122 through the surface in the second direction, and reliability and lifespan of the multilayer capacitor 100 may improve. Also, the at least one first internal electrode 121 and the at least one second internal electrode 122 may efficiently expand in the second direction due to the plurality of margin regions 114, and accordingly, the plurality of margin regions 114 may increase the region of overlap between the at least one first internal electrode 121 and the at least one second internal electrode 122, thereby contributing to improving the capacitance of the multilayer capacitor 100.

Referring to FIGS. 2, 3A, 4 and 5, the multilayer capacitor 100 in an example embodiment may further include a buffer layer 140 having a Young's modulus lower than a Young's modulus of at least one dielectric layer 111.

Since capacitance relative to a unit size of the multilayer capacitor 100 may increase as a dielectric constant of the at least one dielectric layer 111 increases, the at least one dielectric layer 111 may include a material having a high dielectric constant such as barium titanate ($BaTiO_3$). Since a material having a high dielectric constant, such as barium titanate ($BaTiO_3$), may also have a high piezoelectric properties, an internal stress due to a reverse piezoelectric (or electrostrictive) phenomenon caused by a voltage applied to the multilayer capacitor 100 may be formed.

The buffer layer 140 having a Young's modulus lower than a Young's modulus of the at least one dielectric layer 111 may absorb the internal stress formed by the at least one dielectric layer 111, thereby reducing overall stress of the body 110. When the overall stress of the body 110 is reduced, possibility of cracks in the body 110 may be lowered, and electrical bottleneck points (e.g., voids, unstable internal electrode boundaries, etc.) may be reduced in the body 110 may reduce, such that the withstand voltage may increase.

A relatively low Young's modulus of the buffer layer 140 may indicate that the buffer layer 140 is flexible. In the process of absorbing the surrounding stress, the buffer layer 140 may generate a primary displacement according to the stress in a portion of the buffer layer 140, and may generate a secondary displacement according to the primary displacement in another portion of the buffer layer 140, and this process may be continuous.

That is, in the process in which the buffer layer 140 absorbs the surrounding stress, a displacement deviation between the portions of the buffer layer 140 may increase, and the increased displacement deviation may cause the imbalance of stress in the boundary between the buffer layer 140 and the adjacent layer (e.g., the internal electrode and the dielectric layer).

Accordingly, the buffer layer 140 may have a significantly smaller Young's modulus as compared to a Young's modulus of the at least one dielectric layer 111, thereby preventing cracks and electrical bottleneck points caused by the imbalance of stress in the boundary between the buffer layer 140 and the adjacent layer.

Figure 6:
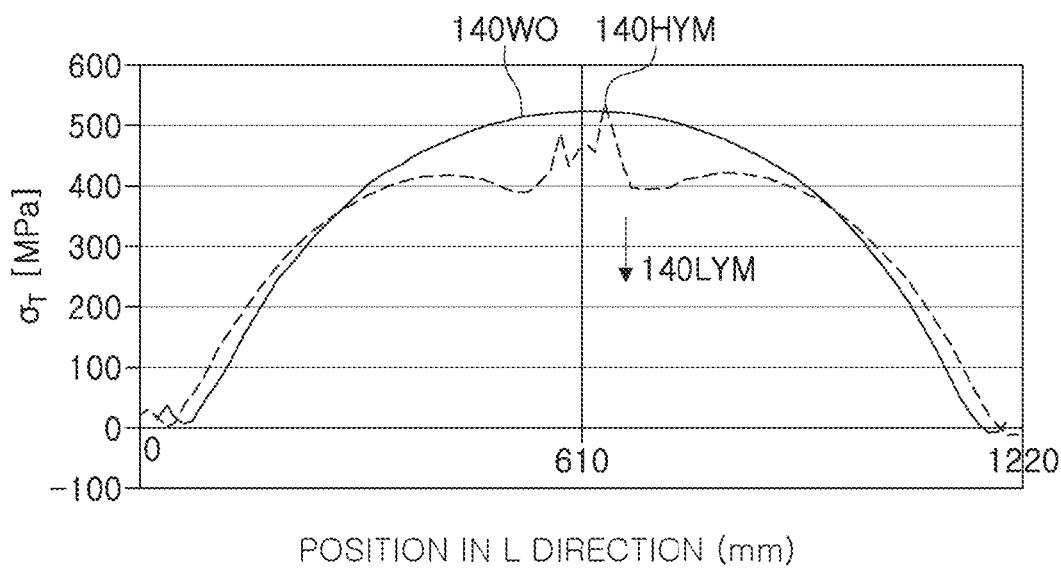
FIG. 6 is a graph illustrating internal stress of a multilayer capacitor according to an example embodiment of the present disclosure.

FIG. 6 is a graph illustrating internal stress of a multilayer capacitor according to an example embodiment.

Referring to FIG. 6, the internal stress curve 140WO of a body without a buffer layer may change evenly depending on the position in the body taken in the L direction, and the internal stress curve 140HYM of the body including a buffer layer having a small difference in Young's modulus may have a large deviation in internal stress depending on the position in the body taken in the L direction.

The maximum stress of the internal stress curve 140HYM of the body having the buffer layer of which a difference in the Young's modulus is not large may be higher than the value in the position of the internal stress curve 140WO of the body without the buffer layer, taken in the L direction. This may be due to the imbalance of stress in the boundary between the buffer layer and the adjacent layer.

When the Young's modulus of the buffer layer decreases, the direction of change 140LYM of the internal stress curve may be a direction in which the overall internal stress may decrease. When the maximum stress of the internal stress curve is lower than the value of the internal stress curve of the body without the buffer layer, the body may reduce the overall internal stress and may also reduce the imbalance of stress in the boundary between the buffer layer and the adjacent layer.

Table 1 below lists the maximum stress according to the Young's modulus of the buffer layer. In Table 1, the normalized maximum stress may refer to a value obtained by dividing the internal stress in the example in which the buffer layer is not provided in the position corresponding to the maximum stress by the maximum stress. The values in Table 1 are measured when the dielectric layer includes a barium titanate (BaTiO$_3$) ceramic material, and the Young's modulus of the barium titanate ceramic material may be 135 GPa.

TABLE 1

| Young's modulus of buffer layer (Reference numeral in FIG. 6) | Maximum stress (MPa) | Normalized maximum stress |
|---|---|---|
| No buffer layer (140WO) | 526 | 1 |
| 200 GPa | 578.6 | 1.1 |
| 100 GPa (140HYM) | 554.9 | 1.04 |
| 50 GPa (140LYM) | 525.5 | 0.99 |
| 25 GPa | 465.0 | 0.88 |
| 10 GPa | 328.6 | 0.62 |
| 5 GPa | 304.7 | 0.58 |

Referring to Table 1, the buffer layer having a Young's modulus of 100 GPa may have a Young's modulus lower than that of barium titanate, but the normalized maximum stress thereof may be higher than 1. Since the buffer layer having a Young's modulus of 50 GPa may have the Young's modulus significantly lower than the Young's modulus of barium titanate, the normalized maximum stress may be lower than 1.

Accordingly, the multilayer capacitor in an example embodiment may have a Young's modulus of greater than 0 time and (50/135) times or less of the Young's modulus of the dielectric layer, or may have a Young's modulus of 50 GPa or less, thereby reducing overall internal stress and reducing the imbalance of stress in the boundary between the buffer layer and the adjacent layer, and accordingly, cracks due to internal stress may be reduced or the withstand voltage properties may improve.

For example, the buffer layer may include at least one of epoxy, polyimide, and Ajinomoto build-up film (ABF). Since a Young's modulus of the epoxy may be 3.8 GPa, which may be significantly lower than a Young's modulus of barium titanate, and the normalized maximum stress may be 0.56. Polyimide and ABF having high flexibility may have a Young's modulus significantly lower than the Young's modulus of barium titanate. The material of the buffer layer may be confirmed through Energy dispersive x-ray spectroscopy (EDS) analysis.

To describe EDS in greater detail, the cross-sectional surface exposed by cutting or grinding the body 110 of the sample of the multilayer capacitor on an X-Z plane (e.g., a L-T plane or a W-T plane) including the center may be pretreated (e.g., fixing a sample and coating with a material with low electrical conductivity), and the electron beam may be scanned into the pretreated sample. In this case, each portion of the sample may emit X-rays while being stabilized from an excited state according to the electron beam, and the energy value of X-rays may vary depending on the material of each portion of the sample. Accordingly, the collector may collect the X-rays, and the computing system may identify the material of each portion of the sample by analyzing whether the energy value of the X-rays falls within a specific numerical range, and the Young's modulus of the corresponding portion may be determined on the basis of the material. In some embodiments, the Young's modulus of the dielectric layer and the buffer layer may be measured by a nanoindentation method. In some embodiments, the Young's modulus of a bulk body produced from the material constituting the dielectric layer and Young's modulus of a bulk body produced from the material constituting the buffer layer may be subjected to stress-strain measurement according to a tensile test.

Referring back to FIGS. 2, 3A, 4 and 5, the number of at least one first internal electrode 121 may be two or more, the number of at least one second internal electrode 122 may be two or more, the number of the at least one dielectric layer 111 may be two or more, a portion of the at least one first internal electrode 121 may be disposed on the buffer layer 140, the other portion thereof may be disposed below the buffer layer 140, a portion of the at least one second internal electrode 122 may be disposed on the buffer layer 140, the other portion thereof may be disposed below the buffer layer 140, a portion of the at least one dielectric layer 111 may be disposed on the buffer layer 140 and the other portion thereof may be disposed below the buffer layer 140.

Accordingly, the buffer layer 140 may efficiently absorb the internal stress of the dielectric layer disposed thereon and the internal stress of the dielectric layer disposed therebelow.

The internal stress of the at least one dielectric layer 111 may have a vertical (T direction) vector component and a horizontal vector component, the ratio of the horizontal vector component overlapping each other may be higher than that of the vertical vector component in the same direction, and the body 110 may be similar to a symmetrical structure in the T direction from the center, such that the region having the greatest internal stress in the body 110 may include the center of the body 110.

Accordingly, the buffer layer 140 may be disposed in the region including the center of the body 110, such that the buffer layer 140 may efficiently absorb the internal stress of the body 110.

Since the stress absorbing performance of the buffer layer 140 may increase as the volume of the buffer layer 140 increases, the buffer layer 140 may absorb more stress by having a thickness greater than the thickness of each of the at least one dielectric layer 111. The internal stress of the multilayer capacitor 100 may increase as the applied voltage increases, and the buffer layer 140 may efficiently absorb the large internal stress caused by applying the high voltage by having a thickness greater than the thickness of each of the at least one dielectric layer 111, and the withstand voltage of the multilayer capacitor 100 may increase.

For example, since the thickness of the buffer layer 140 may be proportional to the number of layers of the buffer layer 140, the thickness may be adjusted by adjusting the number of layers of the buffer layer 140. Here, the thickness of the first layer may be the same as the thickness of each of the at least one dielectric layer 111. Alternatively, the buffer layer 140 may be implemented as a single layer having a relatively great thickness. The thickness of the buffer layer 140 may be measured by analysis using at least one of transmission electron microscopy (TEM), atomic force microscope (AFM), scanning electron microscope (SEM), an optical microscope, and a surface profiler, and may be measured by dividing the length taken in the X-direction (e.g., L direction) by integrating the length of the buffer layer 140 taken in the Z-direction with respect to the X-direction on the cross-sectional surface exposed by cutting or grinding the body 110 to an X-Z plane (e.g., a L-T plane) including the center.

For example, the buffer layer 140 may be laminated in advance and may be simultaneously fired when the at least one dielectric layer 111 is fired. Alternatively, the buffer layer 140 may be fired in advance at a temperature lower than the firing temperature of the at least one dielectric layer 111 and may be laminated on the at least one dielectric layer 111, and the body 110 may be formed by pressing at a curing temperature while the buffer layer 140 is laminated.

Figure 3B:
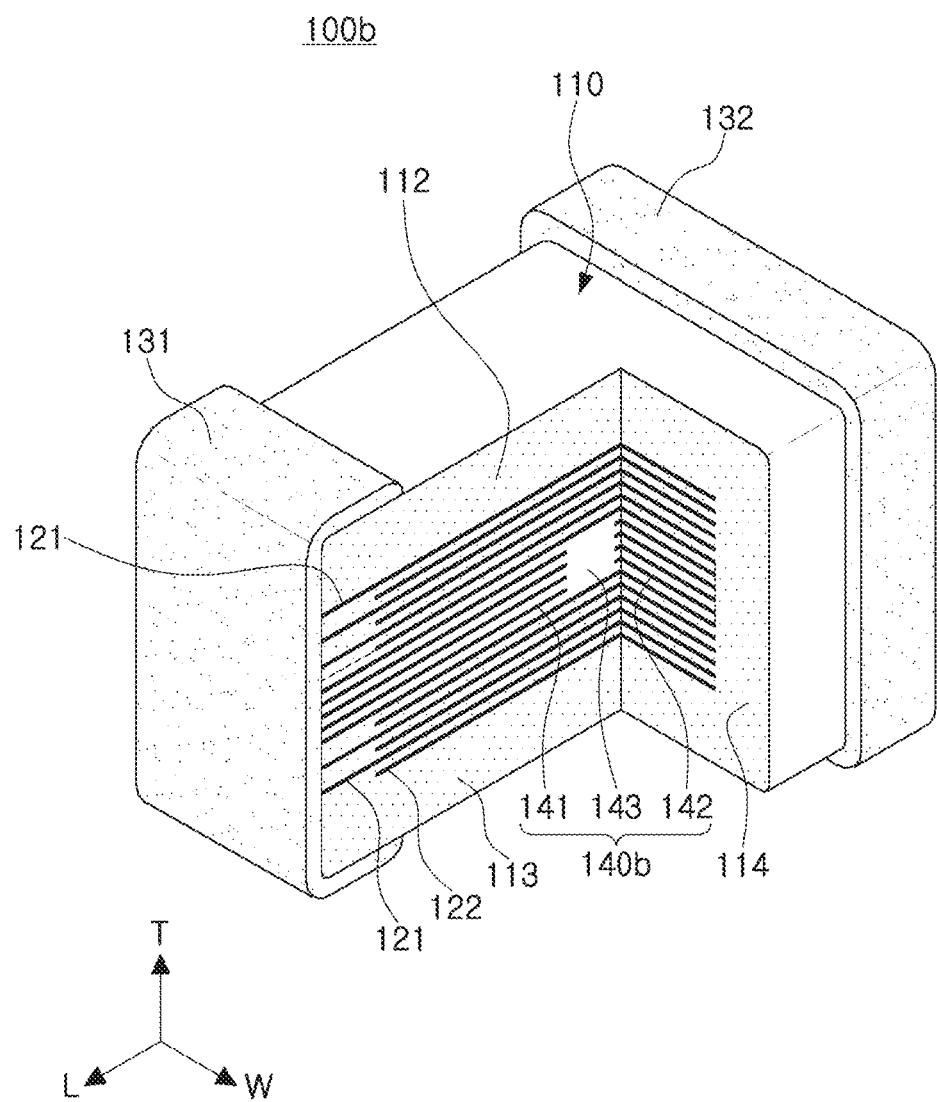
FIG. 3B is a perspective diagram illustrating a structure in which a plurality of dummy electrodes are disposed in a buffer layer of a multilayer capacitor according to an example embodiment of the present disclosure.

FIG. 3B is a perspective diagram illustrating a structure in which a plurality of dummy electrodes are disposed in a buffer layer of a multilayer capacitor according to an example embodiment of the present disclosure.

Referring to FIG. 3B, the buffer layer 140b of the multilayer capacitor 100b in an example embodiment may include first and second dummy electrodes 141 and 142, and may have a region 143 including a center between the first and second dummy electrodes 141 and 142.

The first and second dummy electrodes 141 and 142 may be connected to the first and second external electrodes 131 and 132, respectively, and do not overlap each other in the first direction (e.g., T direction) in the buffer layer 140b. Accordingly, the first and second dummy electrodes 141 and 142 may not substantially form capacitance, and may reduce the possibility of delamination of at least one first internal electrode 121, at least one second internal electrode 122, and at least one dielectric layer 111, and may improve structural stability of the body 110, thereby increasing the withstand voltage.

According to the aforementioned example embodiments, the multilayer capacitor may reduce cracks caused by internal stress or may increase withstand voltage properties.

While the example embodiments have been illustrated and described above, it will be apparent to those skilled in the art that modifications and variations could be made without departing from the scope of the present invention as defined by the appended claims.

What is claimed is:

1. A multilayer capacitor, comprising:
a body including a capacitance region in which at least one first internal electrode and at least one second internal electrode are alternately laminated in a first direction with at least one dielectric layer interposed therebetween; and
first and second external electrodes spaced apart from each other and disposed on the body to be connected to the at least one first internal electrode and the at least one second internal electrode, respectively,
wherein the body further includes a solid buffer layer disposed in the capacitance region and an insulating material of the buffer layer has a Young's modulus of greater than 0 time and (50/135) times or less of a Young's modulus of the at least one dielectric layer.

2. The multilayer capacitor of claim 1,
wherein the at least one first internal electrode is a plurality of first internal electrodes,
wherein the at least one second internal electrode is a plurality of second internal electrodes,
wherein the at least one dielectric layer is a plurality of dielectric layers, and
wherein a position of the buffer layer is located between the plurality of first internal electrodes, between the plurality of second internal electrodes, and between the plurality of dielectric layers.

3. The multilayer capacitor of claim 2, wherein the buffer layer is disposed in a region including a center of the body.

4. The multilayer capacitor of claim 2, wherein a thickness of the buffer layer is greater than a thickness of each of the plurality of dielectric layers.

5. The multilayer capacitor of claim 1, wherein the buffer layer includes first and second dummy electrodes connected to the first and second external electrodes, respectively, and not overlapping each other in the first direction.

6. The multilayer capacitor of claim 1, wherein the buffer layer includes at least one of epoxy, polyimide, and an Ajinomoto build-up film (ABF).

7. The multilayer capacitor of claim 1,
wherein the at least one dielectric layer includes a barium titanate ($BaTiO_3$) ceramic material, and
wherein the Young's modulus of the buffer layer is 50 GPa or less.

8. A multilayer capacitor, comprising:
a body including a capacitance region in which at least one first internal electrode and at least one second internal electrode are alternately laminated in a first direction with at least one dielectric layer interposed therebetween; and
first and second external electrodes spaced apart from each other and disposed on the body to be connected to the at least one first internal electrode and the at least one second internal electrode, respectively,
wherein the body further includes a solid buffer layer disposed in the capacitance region and a solid insulating material of the buffer layer has a Young's modulus of 50 GPa or less.

9. The multilayer capacitor of claim 8, wherein the buffer layer is disposed in a region including a center of the body.

10. The multilayer capacitor of claim 8, wherein a thickness of the buffer layer is greater than a thickness of each of the at least one dielectric layers.

11. The multilayer capacitor of claim 8, wherein the buffer layer includes first and second dummy electrodes connected to the first and second external electrodes, respectively, and not overlapping each other in the first direction.

12. The multilayer capacitor of claim 8, wherein the buffer layer includes at least one of epoxy, polyimide, and an Ajinomoto build-up film (ABF).

13. A multilayer capacitor, comprising:
a body including at least one first internal electrode and at least one second internal electrode alternately laminated in a first direction with at least one dielectric layer interposed therebetween, and a buffer layer disposed between the at least one first internal electrode and the at least one second internal electrode, the buffer layer comprising at least one of epoxy, polyimide, and an Ajinomoto build-up film (ABF); and
first and second external electrodes spaced apart from each other and disposed on the body to be connected to the at least one first internal electrode and the at least one second internal electrode, respectively.

14. The multilayer capacitor of claim 13, the buffer layer has a Young's modulus lower than a Young's modulus of the at least one dielectric layer.

15. The multilayer capacitor of claim 13, wherein the buffer layer has a Young's modulus of greater than 0 time and (50/135) times or less of a Young's modulus of the at least one dielectric layer.

16. The multilayer capacitor of claim 13, wherein the buffer layer has a Young's modulus of 50 GPa or less.

* * * * *